July 27, 1937.  P. C. ZUMBUSCH  2,088,007
METHOD AND APPARATUS FOR INJECTING FUEL INTO INTERNAL COMBUSTION ENGINES
Filed Dec. 5, 1935

INVENTOR
P.C. Zumbusch
BY J. William Carson
ATTORNEY

Patented July 27, 1937

2,088,007

UNITED STATES PATENT OFFICE 2,088,007

METHOD AND APPARATUS FOR INJECTING FUEL INTO INTERNAL COMBUSTION ENGINES

Peter C. Zumbusch, Easton, Pa.

Application December 5, 1935, Serial No. 52,957

23 Claims. (Cl. 299—107.2)

The present invention relates to the injection of fuel in internal combustion engines, and while the description is particularly directed to the application of the invention to the injection of liquid fuel into engines of the Diesel type, in which ignition is effected by the heat of compression in the engine cylinders, the invention is nevertheless applicable to engines employing lighter fuels and having other types of ignition systems.

It has hitherto been the practice in designing and operating Diesel engines, as well as other internal combustion engines employing fuels injected as liquids, to use a high pressure fuel pump in order to supply fuel to an atomizer. Atomization has, heretofore, been accomplished by forcing fuel through a fine orifice, by compressed air or, as in solid injection systems, by means of hydraulic pressure without the aid of compressed air. The pressures must necessarily be very high in order to force the required quantity of fuel through the fine orifices necessary for proper atomization, in the short duration of the period of injection. The speed at which it is, at present, practical to run engines with solid injection, is limited by difficulties associated with the very high hydraulic pressures required to force the desired fuel charge through the atomizer in the exceedingly short injection period (for high speed engines).

The field of usefulness of internal combustion engines employing fuels injected as liquids is not at all limited to marine equipment nor to stationary power plants, as there has in fact already been a decided advance toward Diesel engine propulsion of automotive vehicles and aircraft. Here, however, the development has been hampered by the already referred to requirement for extremely high pressures for accomplishing the injection of the fuel in high speed engines comparable with high speed gasoline engines running at 3200–3700 R. P. M., such pressures being, for instance, in the neighborhood of five thousand to twenty thousand pounds per square inch. Pressures of the magnitude indicated require very carefully made and costly equipment and the result has been that commercial Diesel engines for automotive vehicle or aircraft propulsion have been built to operate in the neighborhood of about 2200 R. P. M., in consequence of which the well known advantages of high engine speeds such as are now generally employed for vehicular or aircraft propulsion, are not obtained.

Aside from the general objections and difficulties associated with high pressure injection systems for internal combustion engines, such as clogging of nozzles, leakage of connections and seals, causing a corresponding inaccuracy in the fuel charge for each cylinder, and others at present recognized by designers and operators, several further specific difficulties are encountered with the exceedingly high pressure fuel injection required for engines designed and operated at relatively high speeds. These are: an air bound system; difficulties due to the compressibility of the fuel at high pressures, as well as to the elasticity of the material of which the fuel line is made, which together cause pulsations and vibrations; and further as the fuel charge is very small, wear of pump parts causes a proportionately greater irregularity of fuel charge than would be encountered with low pressure systems.

It is the primary object of the present invention to overcome the various difficulties and objections referred to by providing a fuel injector eliminating high injection pressures, fuel injection pumps and nozzles, thereby improving upon present methods of injection and making it possible to operate at considerably higher speeds than have heretofore been obtainable.

It is another object of the present invention to provide an improved method of injecting liquid fuel into an internal combustion engine which comprises spraying the fuel into the combustion chamber of the engine substantially radially over a peripheral path, whereby to obtain a wider and more uniform distribution of atomized fuel within the combustion chamber with attendant improved combustion thereof.

It is another object of the invention to provide a fuel oil injector which meters the fuel oil accurately at various loads without the necessity of cut-off sleeves or by-pass valves, and which effects an even flow of atomized fuel at all loads by reason of elimination of the pulsations which occur in the high pressure fuel lines of present day engines.

Another object of the invention is to provide an injector having moving parts of small mass and low inertia, whereby higher operating speeds can be more readily and more economically obtained.

A further object is to provide a fuel injector which is light in weight because of elimination of high operating pressures, and which for the same reason is more economical to manufacture.

Still another object is to provide an injector having a positive and easy adjustment for the quantity of fuel supplied to a single cylinder, and also to provide for equal, though readily variable fuel supply to the various cylinders of multi-cylinder engines.

These and other objects of the invention will be more fully apparent as the description proceeds in conjunction with the accompanying drawing, wherein.

Figures 1, 2:
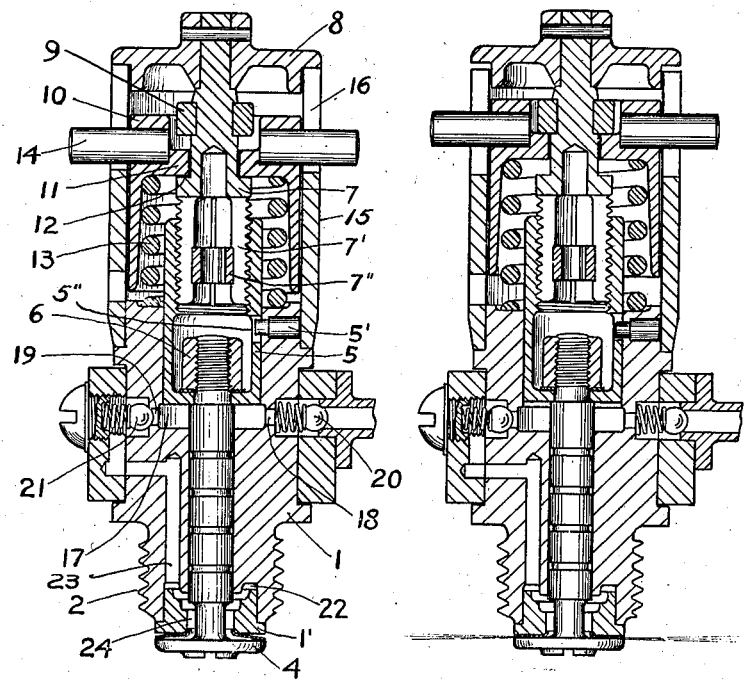
Figure 1 is a view in cross-section of a fuel oil injector in accordance with the present invention, the parts being shown in the non-injecting "charged" position.
Figure 2 is a view similar to Figure 1, but with the parts in the oil injecting position.

Referring to Figure 1, my fuel oil injector in one of its embodiments comprises a body member 1 provided with screw threads 2 for securing the body member in the head of an engine cylinder. The body member is centrally bored to receive with a relatively close working fit a shank 3 of an atomizing element, the latter of which includes an atomizer plate 4. The shank 3 is provided with labyrinth sealing grooves within the central bore of the body member. The upper portion of the body member 1 is bored out to an enlarged diameter to receive with a relatively close working fit a hollow elongated plunger 5, which is secured against a shoulder formed on the shank 3 by a reduced portion of the shank, by securing means in the form of a nut 6 threaded on a threaded upper portion of the shank 3.

An adjusting member 7, the function of which will be explained more fully hereinafter, is provided with a depending externally threaded flange which is split to form a plurality of segments 7', the threads of which flange are adapted to cooperate with internal threads formed within the upper end of the hollow elongated plunger 5. A split collar 7" of relatively heavy resilient material is compressed and forced within the central opening of the depending flange and serves to expand the segments 7' and form a friction lock for the threads on the flange and the plunger. An adjusting wheel 8 is secured in a suitable manner to an upward extension of the adjusting member 7, whereby rotation of the wheel 8 will vary the longitudinal relationship of the adjusting member 7 and the plunger 5 through the medium of the threaded engagement therebetween. In order to prevent rotation of the plunger with the adjusting member, a pin 5' is provided, one end of which is secured in the wall of the body member 1 and the other end of which is adapted to engage an opening 5" in the wall of the plunger. A flange 9, preferably of a metal such as hardened steel, is secured to the upward extension of the adjusting member 7 and serves to receive hammer blows of a percussion head 10. The latter, which is hollowed out on its upper surface to receive the flange 9 and on its lower surface to receive the plunger 5 and a coiled spring 13, is provided with a reduced sleeve portion 11, which bears on a flange 12 of the adjusting member 7. The spring 13 normally urges the percussion head 10 upwardly, the percussion head being normally retained in its lowermost position, with the sleeve portion 11 in engagement with the flange 12, by releasably restrained elements shown in the form of sturdy pins 14 secured in the percussion head and extending radially outwardly with respect to the longitudinal axis of the injector.

A guide sleeve 15, suitably apertured at 16 to permit vertical movement of the pins 14, is secured to the body member 1 and overlies a depending flange of the adjusting wheel 8.

The body member 1 is hollowed out to form a chamber 17 concentrically disposed with respect to the shank 3 and the plunger 5. The body member is also bored out at 18 to form an oil inlet passage communicating with the chamber 17, and is further bored out at 19 to provide an oil discharge passage, likewise communicating with the chamber 17. A spring pressed suction valve 20 is provided in the oil inlet passage 18, which valve is arranged to permit oil to be drawn therethrough into the chamber 17 from a source of supply, but which prevents a return flow of the oil to the source. A spring pressed check valve 21 is disposed in the oil discharge passage 19, this valve being provided to permit flow of oil out of the chamber 17 but not back into the chamber, once it has been discharged therefrom. The body member 1 is still further hollowed out to form a chamber 22 concentrically disposed with respect to the shank 3, and a passage 23 is provided, which connects the oil discharge outlet 19 of the chamber 17 with the chamber 22, while the aperture 24 in the lower end of the body member and through which the shank 3 passes, forms an annular passage between the body member and a reduced portion of the shank 3. The lower end of the body member 1 may conveniently be formed by a bushing 1', so as to facilitate the formation of the chamber 22 and of the passage 23.

Figure 3:
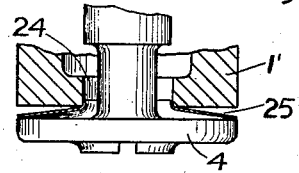
Figure 3 is a view in cross-section and on an enlarged scale of one form of oil atomizing element in accordance with the invention.

The construction of my injector at the end adjacent the oil atomizing element, which includes the atomizer plate 4, is of special importance to the present invention, and it is therefore shown on an enlarged scale in Figure 3, from which it will be seen that a diaphragm-like element 25 is interposed between the upper surface of the atomizer plate 4 and the lower surface of the body member bushing 1'. This diaphragm is preferably made of spring steel of sufficient resiliency to permit a reciprocating movement of the shank 3, and with sufficient stiffness to secure even contact pressure with the atomizer plate 4.

In the operation of my injector device, the percussion head 10 is reciprocated at a rate dependent upon the number of revolutions at which the engine is operating, the reciprocation being effected by releasing the pins 14 and alternately returning them to their normal position, by reason of which the coiled spring 13 is alternately expanded and compressed.

Upon upward movement of the percussion head 10 under the influence of the spring 13, the percussion head forcibly engages the flange 9, which latter, being secured to the shank 3 moves the latter upwardly a distance which is limited only by the position of the adjusting member 7 and the predetermined dimensions of the atomizing element. At the same time the upward movement of the plunger 5 draws oil through the suction valve 20 into the chamber 17. Upon the return movement of the pins 14, the shank 3 is returned to its initial position, carrying with it the plunger 5 which then expels oil from the chamber 17 into the passage 23, the chamber 22 and the space between the atomizer plate 4 and the diaphragm 25. When, by successive reciprocatory movements of the shank 3 the various passages have become filled with oil, each succeeding upward stroke of the shank 3, aided by the incompressibility of the oil at low pressures, causes the diaphragm 25 to be sprung, forming a peripheral passage between the circumference of the diaphragm and the atomizer plate through which a finely atomized oil jet is sprayed in an expanding circular path within the engine cylinder, in the manner shown in Figure 2.

By suitable proportioning of the various parts, the proper quantity of fuel oil for each cycle of operation of the engine cylinder will be drawn into and expelled from the chamber 17 by the plunger 5, and this same quantity of fuel oil will be periodically expelled by the atomizing element.

It will be noted that, within the limitations set by the dimensions of the atomizing element, the upward movement of the shank 3 is governed by the position of the adjusting member 7, which latter may be regulated to vary the quantity of fuel oil delivered through the atomizing element, it being understood that the quantity of oil delivered is proportional to the stroke of the shank 3 and that the adjusting member 7, operable through the adjusting wheel 8, directly controls the stroke of the shank.

Figure 4:
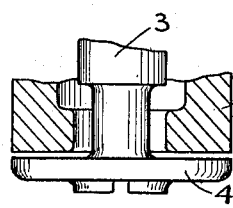
Figure 4 is a view similar to Figure 3 showing another form of oil atomizing unit.

Figure 4 shows a modified construction of the atomizing element in which the diaphragm 25 of Figure 3 is eliminated, the upper surface of the atomizer plate 4 and the lower surface of the body member 1 being arranged to leave a small space therebetween through which the requisite quantity of oil is sprayed and atomized.

Figure 5:
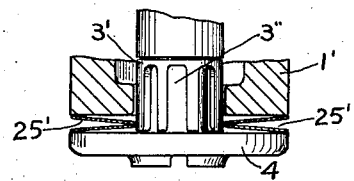
Figure 5 is another view similar to Figure 3 showing still another form of oil atomizing unit.

Figure 5 shows still another modification of the atomizing element in which the upper surface of the atomizer plate 4 and the lower surface of the body member 1 are arranged substantially as in Figure 3, but in which the space therebetween is made great enough to receive a plurality of closely spaced diaphragms 25' generally similar to the diaphragm 25 of Figure 3. A spacer 3' encircles and is centered on the lower part of the shank 3 and serves to center the diaphragms 25' so as to secure uniform peripheral apertures and consequent uniform discharge and atomization of the liquid fuel. The spacer is slotted, as at 3'', so as to furnish a path for the flow of fuel to the atomizing elements.

In each of the forms of atomizing element, as shown in Figures 1, 4, and 5, the pressure necessary for ejecting and atomizing the fuel is governed by the velocity of approach of the members of the atomizing element in conjunction with the inertia of the fuel and the resistance to the flow of fuel offered by the members of the atomizing element. In addition, in the form shown in Figure 3, the pressure is increased by the further resistance to flow offered by the interposed diaphragm, which might be said to form a closed cell retaining the fuel until the pressure built up is sufficient to spring the diaphragm and eject the fuel. The form as shown in Figure 5, while employing a series of diaphragms, is in effect a multiple form of the "closed cell" atomizing element of Figures 1 and 3; but it is at once apparent that modification of Figure 5 to include in multiple the features of Figure 4 is a simple matter and fully within the scope of my invention.

Of the three illustrated embodiments of the atomizing element, that without a diaphragm as shown in Figure 4 has been found to work well with small size injector devices, while the multidisc type shown in Figure 5 is better suited to the larger sizes.

In connection with the so called "closed cell" construction of the atomizing element as shown in Figures 3 and 5, it should be noted that this construction closes the atomizing element against carbonization, and that at the same time objectionable dripping of the liquid fuel is prevented, as the fuel is retained in the cell until sufficient pressure has been built up therein to expel the fuel at a velocity high enough to effect complete atomization. While the "closed cell" feature is not employed in the injector device shown in Figure 4, practically the same advantages are had in smaller sizes of devices made in accordance therewith as with Figure 3, as the liquid fuel is retained in the atomizing element by adhesion to the bounding walls until the necessary atomization effecting pressure has been developed.

Another advantage of the diaphragm type of construction of Figures 3 and 5 is that each flexing and reflexing movement of the diaphragms causes an effective though minute wiping action between the walls defining the apertures of the atomizing element, keeping the apertures clean.

Still another advantage of the "closed cell" type of construction is that the liquid fuel is retained in contact with the entire periphery of the atomizing element, being prevented from flowing to one side, so that uniform atomization is obtained. Here again, substantially the same advantage is had in smaller sizes of devices made in accordance with Figure 4, as the fuel is retained in proper position by adhesion to the walls of the atomizing element, as already described.

It should be understood that the angles of slope of the upper surface of the atomizer plate 4, the lower surface of the body member 1 and the diaphragms or discs where employed, may be different from those shown in the drawing so as to suit different conditions and different shapes of combustion or pre-combustion chambers.

In putting my invention into practice, it is preferable to so proportion and design the elements that the space between the atomizing elements is completely emptied on each cycle of operation; in which case a metal to metal contact between the body member 1, the atomizer plate 4 and the diaphragms, where employed, is had at the end of each upward stroke of the shank 3, so that the flow of heat away from the combustion chamber through the body member 1 is facilitated, thereby preventing pre-ignition.

It will of course be appreciated that the mechanism for alternately releasing the pins 14 and alternately returning them to their normal position, so as to reciprocate the atomizer plate in consonance with the cycle of operation of the engine, may be of any suitable construction, e. g. by direct cam-action, or by a rocker arm and cam mechanism such as is employed in automobile engine construction.

In view of the foregoing description it will be seen that I have provided a fuel injector which is simple in construction, light in weight, and economical to manufacture. My injector eliminates such objectionable features as high injection pressures, fuel injection pumps and nozzles, and by reason of its freedom from the usual high pressures, together with the lightness of its parts and the attendant small mass and low inertia, it may be operated at considerably higher speeds than have heretofore been obtainable in internal combustion engines, thus making it possible to obtain higher engine speeds of the magnitude usually associated with gasoline engines. My invention eliminates not only cumbersome and troublesome air compressing and hydraulic equipment, but also the faulty operation which is inherent in injectors which employ nozzles, which are subject to clogging and dripping. My device further eliminates uneven injection such as occurs in injectors subject to pulsations in the usual high pressure fuel lines. Instead, my device meters the fuel oil accurately at various loads without the necessity of cut-off sleeves or by-pass valves. My invention also enables a positive and easy adjustment of the quantity of fuel supplied to an engine cylinder to be obtained. Furthermore, by reason of the delivery of the atomized oil over a wide peripheral path, danger of clogging, such as is encountered with nozzles, is avoided, and extremely fine oil filters need not be employed.

It will also be seen that I have at the same time provided an improved method of injecting fuel into internal combustion engines comprising spraying the fuel into the combustion chamber of the engine substantially radially over a peripheral path.

While my invention has been described with specific reference to the accompanying drawing, various modifications and substitutions may be made within the spirit and scope of the invention, and I accordingly do not wish to limit my invention, except as defined in the appended claims.

I claim:

1. A liquid fuel injector for internal combustion engines comprising a body member adapted to be secured in operative relation to the combustion chamber of an engine cylinder and provided with a chamber having a fuel inlet, an opening in a wall of said body member for establishing communication between said chamber and the combustion chamber, a disc-like spraying member disposed with respect to said opening in spaced relationship therewith in a manner to provide a peripheral passage between adjacent surfaces of the spraying member and the body member in communication with said opening and terminating in a peripheral aperture, means to cause a flow of liquid fuel from the fuel inlet through said chamber to a point adjacent said peripheral aperture, means other than the pressure of the fuel to prevent a reverse flow of the liquid fuel from said body member to the fuel inlet, and normally energized releasable means to forcibly move said spraying member toward said opening, whereby to exert a pressure on the fuel within the body member adjacent said opening and thereby expel a portion of the fuel through said peripheral aperture.

2. A liquid fuel injector for internal combustion engines comprising a body member adapted to be secured in operative relation to the combustion chamber of an engine cylinder and provided with a chamber having a fuel inlet, an opening in a wall of said body member for establishing communication between said chamber and the combustion chamber, a disc-like spraying member disposed with respect to said opening in spaced relationship therewith in a manner to provide a peripheral passage between adjacent surfaces of the spraying member and the body member in communication with said opening, a diaphragm-like element disposed in said peripheral passage and arranged to form a relatively narrow peripheral aperture between the spraying member and the diaphragm-like element in communication with said opening, means to cause a flow of liquid fuel from the fuel inlet through said chamber to a point adjacent said peripheral aperture, means other than the pressure of the fuel to prevent a reverse flow of the liquid fuel from said body member to the fuel inlet, and normally energized releasable means to forcibly move said spraying member toward said opening, whereby to exert a pressure on the fuel within the body member adjacent said opening and thereby expel a portion of the fuel through said peripheral aperture in the form of a spray.

3. A liquid fuel injector for internal combustion engines comprising a body member adapted to be secured in operative relation to the combustion chamber of an engine cylinder and provided with a chamber, an opening in a wall of said body member for establishing communication between said chamber and the combustion chamber, a disc-like spraying member disposed with respect to said opening in spaced relationship therewith in a manner to provide a relatively wide peripheral passage between adjacent surfaces of the spraying member and the body member in communication with said opening and terminating in a relatively wide peripheral aperture, a plurality of diaphragm-like elements disposed in said peripheral passage and arranged to divide said relatively wide peripheral aperture into a plurality of relatively narrow peripheral apertures in communication with said opening, means to cause a flow of liquid fuel through said chamber to points adjacent said plurality of peripheral apertures, means to prevent a reverse flow of the liquid fuel, and means to forcibly move said spraying member toward said opening, whereby to expel a portion of the fuel through said peripheral apertures in the form of a plurality of sprays.

4. A liquid fuel injector for internal combustion engines comprising a body member adapted to be secured in operative relation to the combustion chamber of an engine cylinder and provided with a chamber, an opening in a wall of said body member for establishing communication between said chamber and the combustion chamber, a disc-like spraying member disposed with respect to said opening in spaced relationship therewith in a manner to provide a peripheral passage between adjacent surfaces of the spraying member and the body member in communication with said opening, a relatively stiff but resilient diaphragm-like element disposed in said peripheral passage and arranged to engage said spraying member on a peripheral path with substantially line contact therebetween so as to form a peripheral aperture of substantially zero width, means to cause a flow of liquid fuel through said chamber to a point adjacent the line of contact on said peripheral path, means to prevent a reverse flow of the liquid fuel, and means to forcibly move said spraying member toward said opening, whereby to cause said diaphragm-like element to flex and open up a relatively narrow peripheral aperture between it and the spraying member and to expel a portion of the fuel through said aperture in the form of a spray.

5. A liquid fuel injector for internal combustion engines comprising a body member adapted to be secured in operative relation to the combustion chamber of an engine cylinder and provided with a chamber, an opening in a wall of said body member for establishing communication between said chamber and the combustion chamber, a disc-like spraying member disposed with respect to said opening in spaced relationship therewith in a manner to provide a relatively wide peripheral passage between adjacent surfaces of the spraying member and the body member in communication with said opening and terminating in a relatively wide peripheral aperture, a plurality of relatively stiff but resilient diaphragm-like elements disposed in said peripheral passage and arranged to divide said relatively wide peripheral passage into a plurality of relatively narrow peripheral passages in communication with said opening, adjacent narrow passage defining elements being arranged to engage each other on peripheral paths with substantially line contact therebetween so as to form a plurality of peripheral apertures of substantially zero width, means to cause a flow of liquid fuel through said chamber to points adjacent the lines of contact on said peripheral paths, means to prevent a reverse flow of the liquid fuel, and means to forcibly move said spraying member toward said opening, whereby to cause said diaphragm-like elements to flex and open up a plurality of relatively narrow peripheral apertures between the narrow passage defining elements and to expel a portion of the fuel through said plurality of apertures in the form of a plurality of sprays.

6. A liquid fuel injector for internal combustion engines comprising a body member adapted to be connected in operative relation to the combustion chamber of an engine cylinder and provided with a chamber, a longitudinal passage through said body member terminating at one end in the first mentioned chamber and at the other end in a second chamber of said body member adjacent its point of connection with the combustion chamber, an opening in the wall of said body member at its end adjacent the combustion chamber in alignment with said longitudinal passage and establishing communication between said second named chamber and the combustion chamber, a spindle mounted with a close working fit in said longitudinal passage and extending within said first mentioned chamber at its upper end and within the combustion chamber at its lower end, said spindle and the opening into the combustion chamber being of such relative size as to leave an annular passage from said second named chamber to the combustion chamber, a disc-like spraying member mounted on the lower end of said spindle in spaced relationship with said annular passage in a manner to provide a peripheral passage between adjacent surfaces of the spraying member and the body member and in communication with said annular passage and terminating in a peripheral aperture, a plunger mounted on the upper end of said spindle within the first mentioned chamber and engaging the wall thereof with a close working fit, a fuel inlet connected to said first mentioned chamber at a point below said plunger, means to prevent a flow of fuel out of said first mentioned chamber through said fuel inlet, a fuel outlet connected to said first mentioned chamber at a point below said plunger, a passage connecting said fuel outlet with said second named chamber, means to forcibly reciprocate said spindle to alternately draw fuel into said first mentioned chamber and to cause it to flow through said connecting passage, said second named chamber, and said annular passage to a point adjacent said peripheral aperture, means to prevent a reverse flow of the fuel from said connecting passage to said first mentioned chamber, the forcible upward movement of said spindle serving to move said spraying member toward said annular passage, whereby to expel a portion of the fuel through said peripheral aperture.

7. A liquid fuel injector for internal combustion engines comprising a body member provided with a chamber having a fuel inlet, means to secure said body member in operative relation to the combustion chamber of an engine cylinder, an opening in a wall of said body member for establishing communication between said chamber and the combustion chamber, a spraying member disposed with respect to said opening in spaced relationship therewith in a manner to provide a peripheral passage between adjacent surfaces of the spraying member and the body member in communication with said opening, means to cause a flow of liquid fuel from the fuel inlet through said chamber to the space constituted by said peripheral passage, within which said liquid fuel is temporarily retained, means other than the pressure of the fuel to prevent a reverse flow of the liquid fuel from said body member to the fuel inlet, and normally energized releasable means to forcibly move said spraying member toward said opening, whereby to exert a pressure on the fuel within the body member adjacent said opening and thereby expel at least a portion of the fuel from said peripheral passage.

8. A liquid fuel injector for internal combustion engines comprising a body member provided with a chamber having a fuel inlet, means to secure said body member in operative relation to the combustion chamber of an engine cylinder, an opening in a wall of said body member for establishing communication between said chamber and the combustion chamber, a spraying member disposed with respect to said opening in spaced relationship therewith in a manner to provide a peripheral passage between adjacent surfaces of the spraying member and the body member in communication with said opening, means to cause a flow of liquid fuel from the fuel inlet through said chamber to the space constituted by said peripheral passage, means to temporarily retain the liquid fuel within said peripheral passage, means other than the pressure of the fuel to prevent a reverse flow of the liquid fuel from said body member to the fuel inlet, and normally energized releasable means to forcibly move said spraying member toward said opening, whereby to exert a pressure on the fuel within the body member adjacent said opening and thereby expel at least a portion of the fuel from said peripheral passage.

9. A liquid fuel injector for internal combustion engines comprising a body member provided with a chamber having a fuel inlet, means to secure said body member in operative relation to the combustion chamber of an engine cylinder, an opening in a wall of said body member for establishing communication between said chamber and the combustion chamber, a spraying member disposed with respect to said opening in relatively close but spaced relationship therewith in a manner to provide a peripheral passage between adjacent surfaces of the spraying member and the body member in communication with said opening, means to cause a flow of liquid fuel from the fuel inlet through said chamber to the space constituted by said peripheral passage, within which said liquid fuel is temporarily retained in filmlike relation by adhesion to the adjacent surfaces of the spraying member and the body member, means other than the pressure of the fuel to prevent a reverse flow of the liquid fuel from said body member to the fuel inlet, and normally energized releasable means to forcibly move said spraying member toward said opening, whereby to exert pressure on the fuel within the body member adjacent said opening and thereby expel at least a portion of the fuel from said peripheral passage.

10. A liquid fuel injector for internal combustion engines comprising a body member provided with a chamber having a fuel inlet, means to secure said body member in operative relation to the combustion chamber of an engine cylinder, an opening in a wall of said body member for establishing communication between said chamber and the combustion chamber, a spraying member disposed with respect to said opening in spaced relationship therewith in a manner to provide a peripheral passage between adjacent surfaces of the spraying member and the body member in communication with said opening, means to cause a flow of liquid fuel from the fuel inlet through said chamber to the space constituted by said peripheral passage, means to temporarily retain the liquid fuel within said peripheral passage with the aid of film-like adhesion of the liquid fuel to adjacent surfaces within the peripheral passage, means other than the pressure of the fuel to prevent a reverse flow of the liquid fuel from said body member to the fuel inlet, and normally energized releasable means to forcibly move said spraying member toward said opening, whereby to exert a pressure on the fuel within the body member adjacent said opening and thereby expel at least a portion of the fuel from said peripheral passage.

11. The method of injecting liquid fuel into an internal combustion engine which comprises supplying the fuel between a plurality of spaced surfaces from a source of supply of fuel, preventing a reverse flow of the fuel from between said plurality of spaced surfaces to the source of supply, and causing said surfaces to suddenly approach each other from their initial spaced relationship, whereby pressure is exerted on the fuel between the approaching surfaces so that the fuel is thereby forcibly ejected from between said surfaces and atomized.

12. The method of injecting liquid fuel into an internal combustion engine which comprises supplying the fuel between a plurality of spaced surfaces from a source of supply of fuel, preventing a reverse flow of the fuel from between said plurality of spaced surfaces to the source of supply and causing said surfaces to suddenly approach each other from their initial spaced relationship to direct contact therebetween, whereby pressure is exerted on the fuel between the approaching surfaces so that the fuel is thereby forcibly ejected from between said surfaces and atomized.

13. A liquid fuel injector for internal combustion engines comprising a body member provided with a chamber having a fuel inlet, means to secure said body member in operative relation to the combustion chamber of an engine cylinder, an opening in a wall of said body member in communication with said combustion chamber, a passage in said body member establishing communication between said chamber and said opening, a spraying member disposed with respect to said opening in spaced relationship therewith in a manner to provide a peripheral passage between adjacent surfaces of the spraying member and body member in communication with said opening and terminating in a peripheral aperture, means to effect a flow of liquid fuel from the fuel inlet into said chamber in a predetermined quantity and to effect a flow of an equal quantity of liquid fuel from said chamber through said passage to a point adjacent said peripheral aperture, means other than the pressure of the fuel to prevent a reverse flow of the fuel from said chamber to said fuel inlet, means other than the pressure of the fuel to prevent a reverse flow of the fuel from said passage to said chamber, and normally energized releasable means to forcibly move said spraying member toward said opening; whereby to expel a portion of the fuel through said aperture, as it diminishes in extent of opening, in a quantity equal to said predetermined quantity of liquid fuel.

14. A liquid fuel injector for internal combustion engines comprising a body member adapted to be secured in operative relation to the combustion chamber of an engine cylinder and provided with a chamber having a fuel inlet, a longitudinal passage through said body member terminating at one end in the first mentioned chamber and at the other end in a second chamber of said body member adjacent its point of connection with the combustion chamber, an opening in the wall of said body member at its end adjacent the combustion chamber in alignment with said longitudinal passage and establishing communication between said second named chamber and the combustion chamber, a spindle mounted with a close working fit in said longitudinal passage and extending within said first mentioned chamber at its upper end and within the combustion chamber at its lower end, said spindle and the opening into the combustion chamber being of such relative size as to leave an annular passage from said second named chamber to the combustion chamber, a disc-like spraying member mounted on the lower end of said spindle in spaced relationship with said annular passage in a manner to provide a peripheral passage between adjacent surfaces of the spraying member and the body member in communication with said annular passage and terminating in a peripheral aperture, means associated with said spindle within the first mentioned chamber to cause a flow of liquid fuel from the fuel inlet through said first mentioned chamber to a point adjacent said peripheral aperture, means other than the pressure of the fuel to prevent a reverse flow of the liquid fuel from said body member to the fuel inlet, and means to expel a portion of the fuel through said peripheral aperture comprising means to subject said spindle to a hammer-like blow in a direction away from the combustion chamber of the engine cylinder; whereby to forcibly move said spraying member toward said annular passage and to thereby exert a fuel expelling pressure on the fuel within the body member.

15. A liquid fuel injector for internal combustion engines comprising a body member provided with a chamber having a fuel inlet, means to secure said member in operative relation to the combustion chamber of an engine cylinder, an opening in a wall of said body member for establishing communication between said chamber and the combustion chamber, reciprocatable means mounted within said body member, a spraying member carried by said reciprocatable means and disposed with respect to said opening in spaced relationship therewith in a manner to provide a peripheral passage between adjacent surfaces of the spraying member and the body member in communication with said opening, means operable within said body member to cause a flow of liquid fuel from the fuel inlet through said chamber to the space constituted by said peripheral passage, within which said liquid fuel is temporarily retained, means other than the pressure of the fuel to prevent a reverse flow of the liquid fuel from said body member to the fuel inlet, and means to expel a portion of the fuel from said peripheral passage comprising means to subject said reciprocatable means to a hammer-like blow in a direction away from the combustion chamber of the engine cylinder; whereby to forcibly move said spraying member toward said opening and to thereby exert a fuel expelling pressure on the fuel within the body member.

16. A liquid fuel injector for internal combustion engines comprising a body member adapted to be secured in operative relation to the combustion chamber of an engine cylinder and provided with a chamber having a fuel inlet, an opening in a wall of said body member for establishing communication between said chamber and the combustion chamber, reciprocatable means mounted within said body member, a disc-like spraying member carried by said reciprocatable means and disposed with respect to said opening in spaced relationship therewith in a manner to provide a peripheral aperture between adjacent surfaces of the spraying member and the body member in communication with said opening and terminating in a peripheral aperture, means operable within said body member to cause a flow of liquid fuel from the fuel inlet through said chamber to a point adjacent said peripheral aperture, means other than the pressure of the fuel to prevent a reverse flow of the liquid fuel from said body member to the fuel inlet, and means to expel a portion of the fuel through said peripheral aperture comprising means to subject said reciprocatable means to a hammer-like blow in a direction away from the combustion chamber of the engine cylinder; whereby to forcibly move said spraying member toward said opening and to thereby exert a fuel expelling pressure on the fuel within the body member.

17. A liquid fuel injector for internal combustion engines comprising a body member adapted to be secured in operative relation to the combustion chamber of an engine cylinder and provided with a chamber having a fuel inlet, an opening in a wall of said body member for establishing communication between said chamber and the combustion chamber, a disc-like spraying member disposed with respect to said opening in spaced relationship therewith in a manner to provide a peripheral passage between adjacent surfaces of the spraying member and the body member in communication with said opening and terminating in a peripheral aperture, means operable within said body member to cause a flow of liquid fuel from the fuel inlet through said chamber to a point adjacent said peripheral aperture, means other than the pressure of the fuel to prevent a reverse flow of the liquid fuel from said body member to the fuel inlet, and normally energized releasable means to forcibly move said spraying member toward said opening, whereby to exert a pressure on the fuel within the body member adjacent said opening and thereby expel a portion of the fuel through said peripheral aperture.

18. A liquid fuel injector for internal combustion engines comprising a body member provided with a chamber having a fuel inlet, means to secure said body member in operative relation to the combustion chamber of an engine cylinder, an opening in a wall of said body member for establishing communication between said chamber and the combustion chamber, a spraying member disposed with respect to said opening in spaced relationship therewith in a manner to provide a peripheral passage between adjacent surfaces of the spraying member and the body member in communication with said opening, means operable within the body member to cause a flow of liquid fuel from the fuel inlet through said chamber to the space constituted by said peripheral passage, within which said liquid fuel is temporarily retained, means other than the pressure of the fuel to prevent a reverse flow of the liquid fuel from said body member to the fuel inlet, and normally energized releasable means to forcibly move said spraying member toward said opening, whereby to exert a pressure on the fuel within the body member adjacent said opening and thereby expel at least a portion of the fuel from said peripheral passage.

19. A liquid fuel injector for internal combustion engines comprising a plurality of spaced elements presenting opposed surfaces, means to supply a quantity of liquid fuel between said opposed surfaces and to isolate the same from the source of supply thereof, and means to cause at least one of said surfaces to suddenly approach the other from their initial spaced relationship, whereby pressure is exerted on the fuel between the approaching surfaces and the fuel is forcibly ejected from between said surfaces and atomized.

20. A liquid fuel injector for internal combustion engines comprising a plurality of spaced elements presenting opposed surfaces, a body member movably mounting at least one of said elements, means in said body member to supply a quantity of liquid fuel between said opposed surfaces and to isolate the same from the source of supply thereof, and means to cause at least one of said surfaces to suddenly approach the other from their initial spaced relationship, whereby pressure is exerted on the fuel between the approaching surfaces and the fuel is forcibly ejected between said surfaces and atomized.

21. The method of injecting liquid fuel into an internal combustion engine in successive cycles of operation comprising supplying a predetermined quantity of the fuel between a plurality of spaced surfaces during one portion of a cycle, isolating a quantity of fuel including said predetermined quantity from the source of supply thereof, and causing at least one of said surfaces to suddenly approach the other from their initial spaced relationship, whereby pressure is exerted on the fuel between the approaching surfaces and a quantity of fuel equivalent to said predetermined quantity is forcibly ejected from between said surfaces during another portion of the cycle and atomized.

22. A liquid fuel injector for internal combustion engines comprising a plurality of space elements presenting opposed surfaces, a relatively stiff but resilient diaphragm-like element disposed between said surfaces and adapted to form a normally closed cell with at least one of said surfaces, means to supply a quantity of liquid fuel to said cell and to isolate the same from the source of supply thereof, and means to cause at least one of said surfaces to suddenly approach the other from their initial spaced relationship to thereby flex the diaphragm, whereby pressure is exerted on the fuel in said cell and the fuel is forcibly ejected therefrom and atomized.

23. A liquid fuel injector for internal combustion engines comprising a plurality of spaced elements presenting opposed surfaces, a plurality of relatively stiff but resilient diaphragm-like elements disposed between said surfaces and adapted to form at least one normally closed cell with said surfaces, means to supply a quantity of liquid fuel to said cell and to isolate the same from the source of supply thereof, and means to cause at least one of said surfaces to approach the other from their initially spaced relationship to thereby flex the diaphragms, whereby pressure is exerted on the fuel in said cell and the fuel is forcibly ejected therefrom and atomized.

PETER C. ZUMBUSCH.